United States Patent
Elliott, IV et al.

(10) Patent No.: US 10,324,953 B1
(45) Date of Patent: Jun. 18, 2019

(54) MANAGING REMOTE DATA CENTER FROM ANOTHER DATA CENTER

(71) Applicant: EMC Corporation, Hopkinton, MA (US)

(72) Inventors: William J. Elliott, IV, Holden, MA (US); Anoop George Ninan, Milford, MA (US); Shiva Kalyani Ankam, San Jose, CA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 258 days.

(21) Appl. No.: 14/315,438

(22) Filed: Jun. 26, 2014

(51) Int. Cl.
*G06F 16/27* (2019.01)
*H04L 29/08* (2006.01)

(52) U.S. Cl.
CPC .......... *G06F 16/27* (2019.01); *H04L 67/1097* (2013.01)

(58) Field of Classification Search
None
See application file for complete search history.

(56) References Cited

U.S. PATENT DOCUMENTS

| | | | | |
|---|---|---|---|---|
| 7,707,272 B1* | 4/2010 | Aral | ..................... | G06F 11/2064 709/216 |
| 2004/0088417 A1* | 5/2004 | Bober | ................. | H04L 67/1097 709/227 |
| 2004/0103220 A1* | 5/2004 | Bostick | ................... | H04L 41/00 709/253 |
| 2004/0158777 A1* | 8/2004 | Bae | ....................... | G06F 11/203 714/47.3 |
| 2008/0250024 A1* | 10/2008 | Kvm | ................. | G06F 17/30132 |
| 2011/0307442 A1* | 12/2011 | Sharma | ............. | G06F 17/30174 707/611 |
| 2013/0103836 A1* | 4/2013 | Baniqued | ............ | H04L 41/0803 709/226 |

* cited by examiner

*Primary Examiner* — Charles D Adams
(74) *Attorney, Agent, or Firm* — Daly, Crowley Mofford & Durkee, LLP (57) ABSTRACT

In one aspect, a method includes receiving a request to register a second data storage system of a second data center in a first data storage system of a first data center, storing data center connection information to connect the second data center to the first data center, replicating a database to the first data storage system and enabling a first data storage system to access and control components of the second data center using the component connection information and the component management information. The data base includes component connection information to connect the second storage system to the components of the second data center and component management information required to monitor and manage the components.

17 Claims, 6 Drawing Sheets

MANAGING REMOTE DATA CENTER FROM ANOTHER DATA CENTER

BACKGROUND

Computer systems are constantly improving in terms of speed, reliability, and processing capability. As is known in the art, computer systems which process and store large amounts of data typically include a one or more processors in communication with a shared data storage system in which the data is stored. The data storage system may include one or more storage devices, usually of a fairly robust nature and useful for storage spanning various temporal requirements (e.g., disk drives). The one or more processors perform their respective operations using the storage system. Mass storage systems (MSS) typically include an array of a plurality of disks with on-board intelligent and communications electronics and software for making the data on the disks available.

Companies that sell data storage systems and the like are very concerned with providing customers with an efficient data storage solution that minimizes cost while meeting customer data storage needs. It would be beneficial for such companies to have a way for reducing the complexity of implementing data storage.

SUMMARY

In one aspect, a method includes receiving a request to register a second data storage system of a second data center in a first data storage system of a first data center, storing data center connection information to connect the second data center to the first data center, replicating a database to the first data storage system and enabling a first data storage system to access and control components of the second data center using the component connection information and the component management information. The data base includes component connection information to connect the second storage system to the components of the second data center and component management information required to monitor and manage the components.

In another aspect, an apparatus includes electronic hardware circuitry configured to receive a request to register a second data storage system of a second data center in a first data storage system of a first data center, store data center connection information to connect the second data center to the first data center, replicate a database to the first data storage system and enable a first data storage system to access and control components of the second data center using the component connection information and the component management information. The data base includes component connection information to connect the second storage system to the components of the second data center and component management information required to monitor and manage the components.

In a further aspect, an article includes a non-transitory computer-readable medium that stores computer-executable instructions. The instructions cause a machine to receive a request to register a second data storage system of a second data center in a first data storage system of a first data center, store data center connection information to connect the second data center to the first data center, replicate a database to the first data storage system and enable a first data storage system to access and control components of the second data center using the component connection information and the component management information. The data base includes component connection information to connect the second storage system to the components of the second data center and component management information required to monitor and manage the components.

BRIEF DESCRIPTION OF THE DRAWINGS

Objects, features, and advantages of embodiments disclosed herein may be better understood by referring to the following description in conjunction with the accompanying drawings. The drawings are not meant to limit the scope of the claims included herewith. For clarity, not every element may be labeled in every figure. The drawings are not necessarily to scale, emphasis instead being placed upon illustrating embodiments, principles, and concepts.

Thus, features and advantages of the present disclosure will become more apparent from the following detailed description of exemplary embodiments thereof taken in conjunction with the accompanying drawings in which.

Like reference symbols in the various drawings indicate like elements.

DETAILED DESCRIPTION

In certain embodiments, the current disclosure may enable a distributed software control platform that allows enterprise IT departments and cloud service providers to convert heterogeneous storage systems within a data center into one large storage array. In some embodiments, the current disclosure may enable exposure of logical storage resources and allow enterprise IT departments and cloud service providers to manage heterogeneous storage environments through a simple, robust Representational State Transfer (REST) API and a command-line interface (CLI). In at least one embodiment, one API and one CLI may be used to connect to all the storage arrays in a data center as if they were one large storage array.

In some embodiments, the current disclosure may enable a software platform for multi-tenant environments that delivers a single logical, cloud-scale, geo-distributed storage system for developers and storage/cloud administrators. In certain embodiments, the current disclosure may enable an enterprise to adopt hybrid management models in environments where storage infrastructure resides in enterprise data centers, but is also hosted by a service provider or a public cloud. In certain embodiments, the current disclosure may enable an enterprise to manage hybrid deployments as a single storage array. In further embodiments, the current disclosure may enable a data storage system to scale to millions of storage volumes and file shares. In still further embodiments, the techniques and implementations described herein may be deployed as a vApp, a set of virtual machines.

In certain embodiments, the current disclosure may enable data-centric cloud infrastructures to be managed efficiently and flexibly through a data management software platform. In some embodiments, the current disclosure may simplify the management of complex, heterogeneous, geo-distributed storage resources by exposing the storage systems as logical resources through robust, easy-to-use REST API and CLI interfaces. In most embodiments, the current disclosure may provide integrations into cloud stacks such as VMware® and OpenStack™.

In certain embodiments, the following definitions may be useful:

A data service may be a service for receiving, processing, storing, and protecting data. In certain embodiments, data services provide the high-level data and storage management capabilities of the system.

A control path may be a way to establish and control access to the data.

A data path may be the path the data takes from data storage provider to data storage consumer.

A storage medium may be any medium that is capable of storing data, including, but not limited to a storage array, a storage cluster, a physical disk, a virtual disk, and a virtual storage system.

A tenant may represent an organization operating within a data storage system. In some embodiments, a tenant may be generated in the system for the purposes of security isolation.

A neighborhood may represent a fault domain within a network. In many embodiments, a plurality of data centers may be combined to generate a federation. In some embodiments, the federation failures may occur that may affect the availability of resources. In certain embodiments, the data centers or federation may account for the failures by segmenting the infrastructure into different fault domains. In some embodiments, each fault domain may be designed to be isolated from other fault domains, while part of the same data center, so that each failure within one fault domain does not affect other fault domains.

A transport zone may represent a region of connectivity within a neighborhood. In many embodiments, a transport zone may include a network, such as a SAN network or an IP network. In various embodiments, a transport zone may include addresses (such as a World Wide Names (WWN) that may be in the network for both hosts and storage array ports. In some embodiments, addresses for hosts may include initiator addresses and/or IP addresses. In certain embodiments, a data storage system may be enabled to determine what initiators may be connected to what storage ports by analyzing a transport zone.

An initiator may be an address used in the SAN networking. In many embodiments, an initiator may include a Fiber Channel (FC) initiator and/or an iSCSI initiator. In various embodiments, FC initiators may use a WWN address as a unique identifier in a data storage system. In various embodiments, a WWN may include a port address and/or node address. In certain embodiments, an iSCSI initiator may include addresses of type IQN and EUI. An engine may be a hardware unit within a Symmetrix Array. In various embodiments, a VMAX system may include eight engines, where each engine may include two directors.

A director may be a hardware unit within a Symmetrix Array, on an engine. In some embodiment, each director may include one or more ports.

A project may be a resource organization abstraction that maps resources to applications, virtual data centers, departments, or other entities. In some embodiments, a user may generate their own projects, and may associate multiple resources from different data services with the projects. In most embodiments, resources from one project maybe shared between users under the same tenant.

A Class of Service may represent high-level capabilities and services that may be generated by administrators through composition of resource attributes and quality of services, including level of protection, availability, access protocol, performance, and additional storage/data services, such as versioning/snap, backup, remote replication, data reduction, encryption, and/or other data storage services. In many embodiments, users or tenants may select from a menu of Class of Service entries when generating a volume.

Generally, a data storage array or system may be one or more physical boxes or a cluster of physical boxes. In conventional systems, the data storage array or system may have one control path and one or more data paths. In typical systems, one or more data paths ports may provide data path access to the storage resources contained within the storage system. Typically, the protocols for the data path ports may be fiber channel, Internet Protocol (IP), iSCSI, NFS, or CIFS. Usually, to add more capacity to a data storage array or system, more physical disks, more inline cards, or more CPUs may be added to the data storage array or system. Conventionally, the data storage system or array may be a cluster of storage mediums. Typically, providing management for large numbers of data storage arrays or systems may be challenging.

Figure 1:
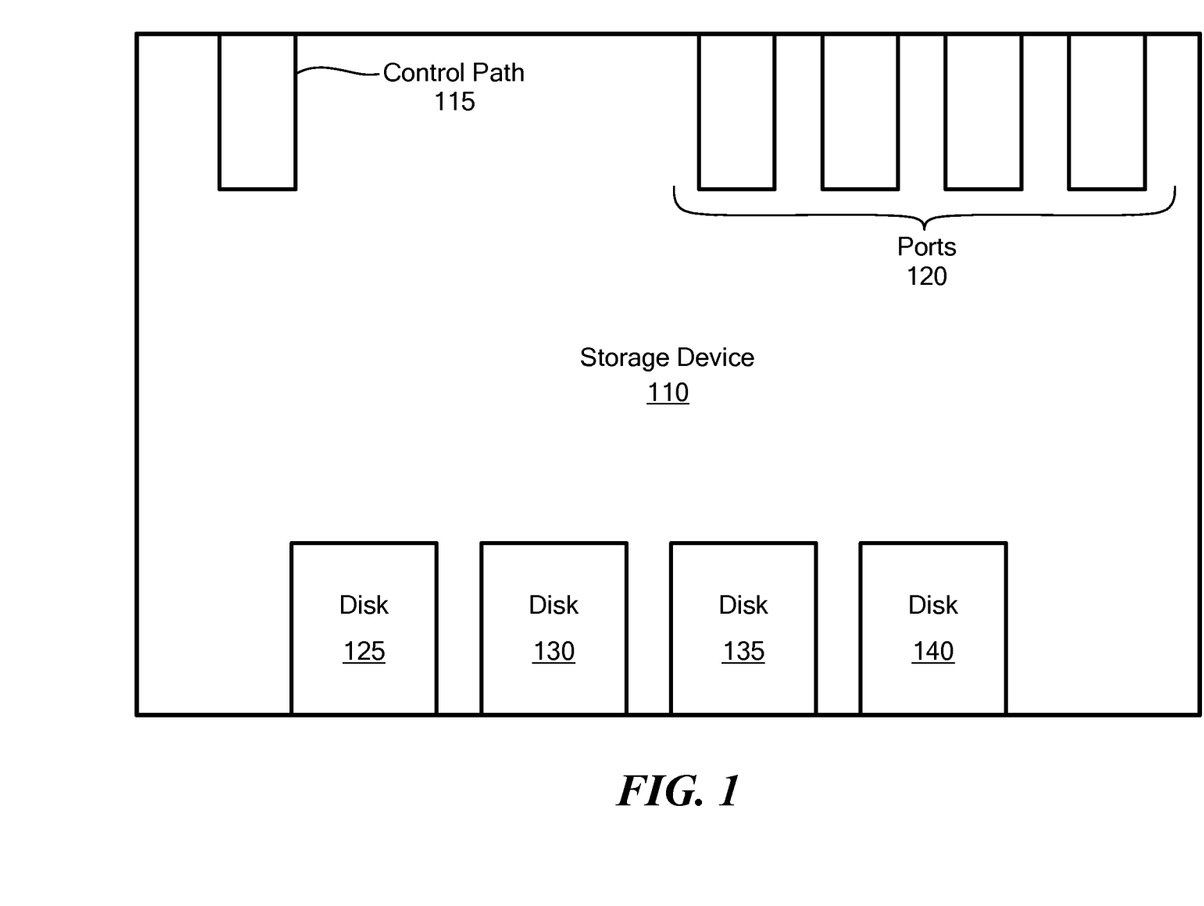
FIG. 1 is a simplified block diagram of an example of a data storage device.

Referring to FIG. 1 a storage device 110 includes a control path 115, ports 120, and disks 125, 130, 135 and 140. Control path 115 enables a user to interface with storage device 110. Control path 115 enables a user to access disks 125, 130, 135 and 140, via the services storage device 110 offers, through one or more of ports 120.

In many embodiments, the current disclosure may enable allocation of storage ports for exporting volumes from storage arrays in a data storage system. In various embodiments, the current disclosure may eliminate the need for an administrator to manually allocate each storage port. In some embodiments, the current disclosure may maximize hardware redundancy between selected allocated paths by applying prioritized filtering of the candidate ports based on their hardware redundancy information. In certain embodiments, an arbitrary number of filters may be applied according to importance. For example, in an embodiment, a higher importance filter may be applied before a lower importance filter. In many embodiments, the current disclosure may enable automatic allocation of storage ports in one or more configurations. In various embodiments, the current disclosure may enable balanced usage and/or allocation of ports from a data storage array.

In many embodiments, the current disclosure may enable optimized port selection for maximum redundancy which may consider both the data storage system, which may include the data storage array and the SAN fabric. In various embodiments, the current disclosure may enable load balancing across one or more data storage ports within a data storage system. In certain embodiments, the current disclosure may enable a user or administrator to dedicate one or more data storage ports for specific uses, such as a specified export group or project.

In various embodiments, a data storage system may include one or more internal constructs and hardware to facilitate giving access to one or more volumes to one or more hosts. In certain embodiments, the one or more internal constructs and hardware may include switches, SAN switches, initiators, directors, engines, and/or storage ports. In many embodiments, a data storage system may include one or more data storage arrays which may be enabled to connect to one or more hosts. In some embodiments, one or more data volumes maybe allocated from one or more data storage arrays for one or more hosts. In other embodiments, a host may have one or more initiators having one or more ports enabled to connect a data storage volume. In many embodiments, a host initiator port may connect to a switch which may enable communication with a data storage volume on a data storage array in a data storage system. In various embodiments, each data storage array may enable access to a data storage volume through one or more ports. In some embodiments, a data storage array may include one or more engines, wherein each engine may include one or more directors. In certain embodiments, each director may include one or more ports which may enable access to one or more data volumes on a data storage array within a data storage system. In other embodiments, a data storage system may use other constructs and hardware to facilitate communication with data volumes within a data storage system.

In many embodiments, administrative data may include storage port registration status. In various embodiments, storage port registration status may specify which storage ports may be used by the data storage system. In certain embodiments, administrative data may include whether zoning may be enabled. In some embodiment, a data storage system may include one or more neighborhoods. In other embodiments, the current disclosure may enable a data storage system to automatically generate connectivity when storage volumes are exported or exposed for consumption. In certain embodiments, automatic zoning of the SAN fabric, i.e. network connectivity of certain components, when storage volumes are exported within a neighborhood may be performed.

In many embodiments, each volume within a data storage system may identify and/or reside within a neighborhood in the data storage system. In various embodiments, a neighborhood may define a data center boundary within a data storage system. In certain embodiments, each transport zone may be contained within a specific neighborhood in a data storage system.

In other embodiments, each transport zone that may be used may identify a candidate set of storage ports and initiators within each respective transport zone that may be used together. In certain embodiments, a data storage system may determine a candidate set of storage ports based on storage ports that a system administrator registered in a given transport zone. In various embodiments, one or more data storage volumes may be connected to one or more hosts where the host initiators are in the same transport zone as the storage ports associated with the one or more data storage volumes. In various embodiments, a port provisioning system may use a candidate set of storage ports to export one or more data storage volumes to a host through a specified transport zone. In some embodiments, a host may be enabled to communicate with multiple transport zones, for example a host may have a first initiator in a first transport zone and a second initiator in a second transport zone. In various embodiments, a host may be enabled to communicate through two or more transport zones which may enable hardware redundancy when generating data paths from the host to the one or more data storage volumes.

In many embodiments, system data may include information on switch and communication availability between each host and data volumes allocated for each host. In some embodiments, system data may include each switch a host may be connected to. In certain embodiments, each host initiator may identify a SAN switch that is directly connected to the host. In other embodiments, system data may include each switch a storage port on a storage array may be connected to. In various embodiments, each candidate storage port may identify a switch that is directly connected to a storage port on a storage array. In many embodiments, system data may include information pertaining to initiator-target communication ability. In various embodiments, the existence of an initiator name and a target name in the same network or a network's database entries may indicate that the initiator and target may be able to communicate with each other.

Figure 2:
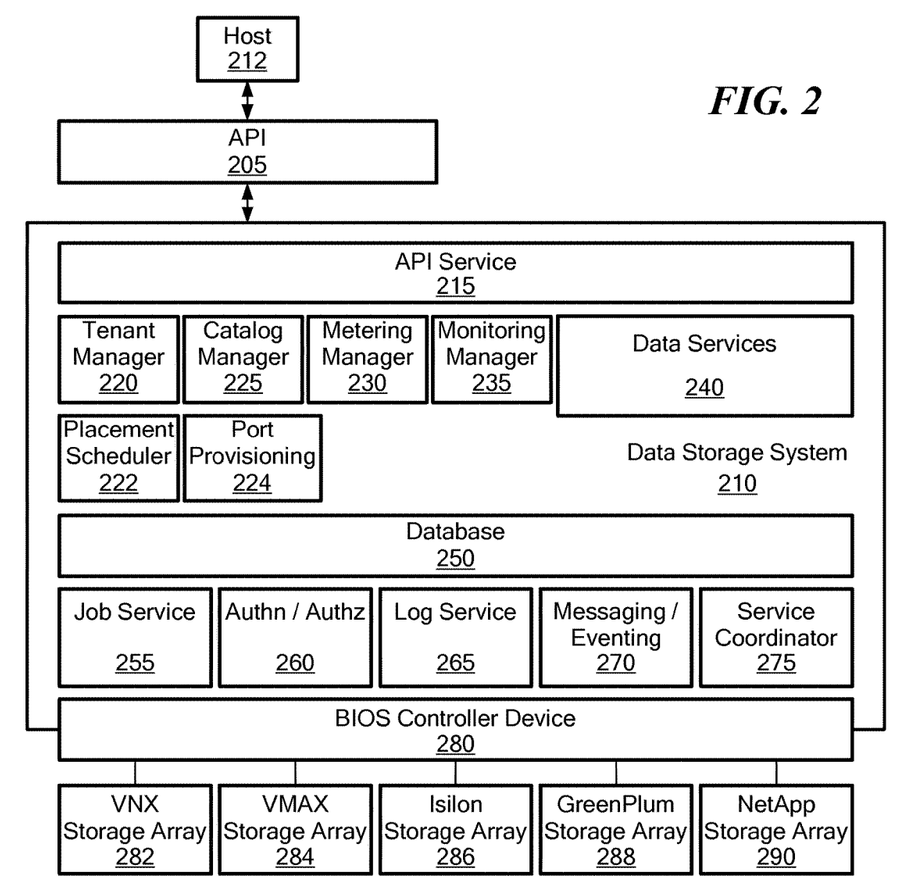
FIG. 2 is a simplified block diagram of an example of a data storage system.

Referring to FIG. 2, API Service 215 enables external access to Host 212 through API 205. API Service 215 communicates requests to one big array, data storage system 210. API Service 215 enables access to Service Coordinator 275, which enables access to other services and management modules. Through Service Coordinator 275, API Service 215 has access to tenant manager 220, catalog manager 225, metering manager 230, monitoring manager 235, data services 240, database 250, job service 255, autlm/authz 260, log service 265, messaging/eventing 270, port provisioning 224, placement scheduler 222, and BIOS Controller Device 280. As shown, port provisioning 224 allocates data storage ports from data storage volumes allocated from attached data storage. In this embodiment, attached data storage includes VNX storage array 282, VMAX storage array 284, Isilon storage array 286, GreenPlum storage array 288, and NetApp storage array 290.

Figure 3:
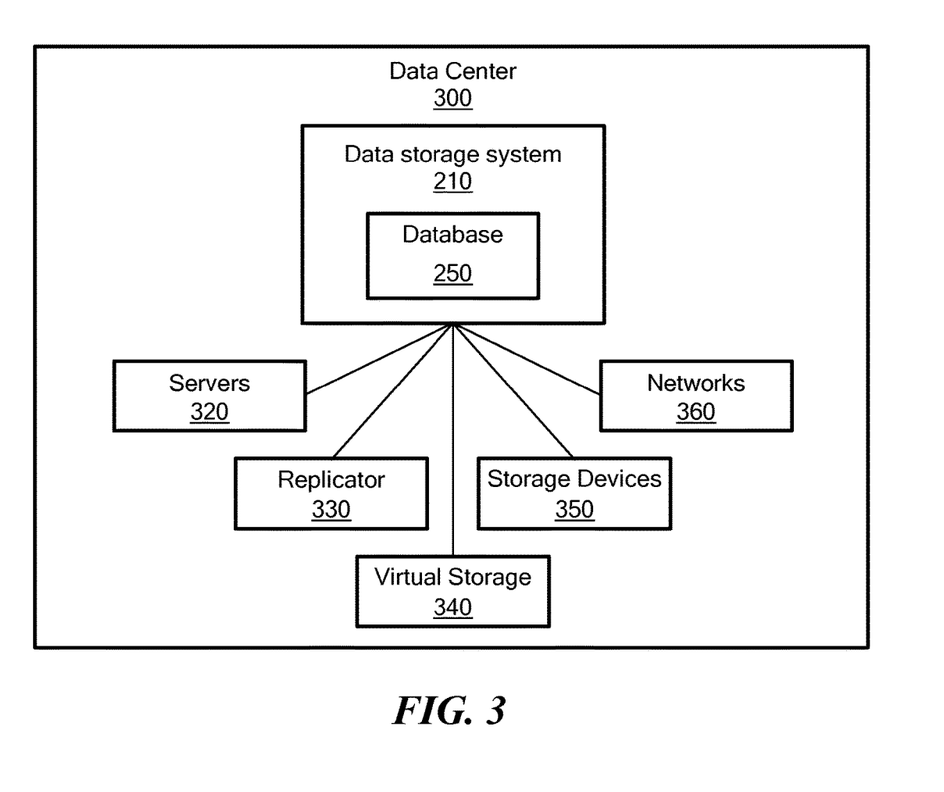
FIG. 3 is a simplified block diagram of a data center.

Referring to FIG. 3, the data storage system 210 may be part of a data center. For example, the data storage system 210 may be included in a data center 300. The data storage system 300 also includes servers 320, a replicator 330 (e.g., a data protection system to replicate data), a virtual storage 340, storage devices 350 and networks 360 (e.g., Fabric network) each connected to the data storage system 210.

The database 250 includes connection information and component management information required to monitor and manage the components (e.g., servers 320, replicator 330, virtual storage 340, storage devices 350 and networks 360). The database 250 stores information about the servers 320 by collecting information about the servers' clusters, storage connectivity interfaces, such as SCSI interfaces, including worldwide name addresses, and operating system type. The database 250 stores information about the replicators 330 by collecting information about protection services provided, inter-geography connectivity between other replicators (used for coordination in cross-geography replication), and metering information for understanding resource use such as remaining replication groups allowed. The data bases stores information about the virtual storage 340 by collecting information about virtual storage arrays and virtual storage pools required to configure coordinated geographically-distributed and protected storage as well as for centralized management and monitoring of virtual storage assets. The database 250 stores information about storage devices 350 by collecting information about physical storage arrays, storage pools, and available capacities required to coordinate intelligent decision-making of storage operations across geographies. The database 250 stores information on the networks 360 by collecting information about storage fabrics, fabric and IP switches, connected storage addresses (WWNs or iSCSI addresses), and configuration information about the fabrics and networks, such as interconnectivity (routing) information.

Figure 4:
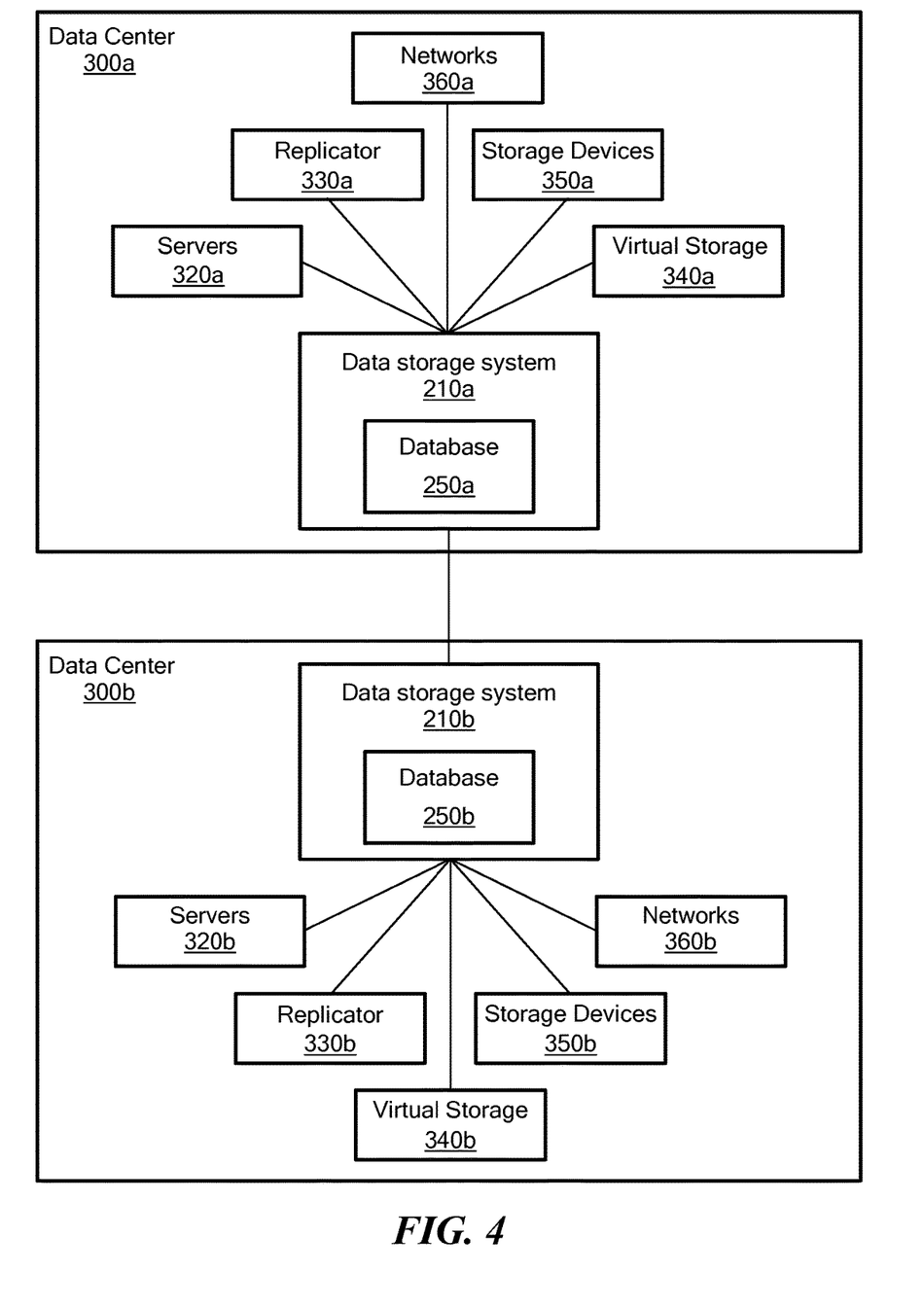
FIG. 4 is a simplified block diagram of two data centers.

Referring to FIG. 4, data storage systems 210a, 210b are substantially similar to the data storage system 210 and data centers 300a, 300b are substantially similar to data center 300. The data storage system 210a includes a database 250a substantially the same as the database 250 and the data storage system 210b includes a database 250b substantially the same as the database 250.

The data center 300a includes the data storage system 210a, servers 320a, replicator 330a, virtual storage 340a, storage devices 350a and networks 360a and the data center 300b includes the data storage system 210b, servers 320b, replicator 330b, virtual storage 340b, storage devices 350b and networks 360b.

The data storage system 210a, 210b in one data center 300a, 300b may be used to access components in another data center 300b, 300a. In particular, the data storage system 210a may be used to access components (e.g., servers 320b, replicator 330b, virtual storage 340b, storage devices 350b and networks 360b) through the data storage system 210b.

By accessing other data centers, there can be centralized management of multiple datacenters using multiple coordinated data storage systems 210. Centralized management provides a single view of all datacenters across all geographies and a single point of access and management across all datacenters, without the need to log into different data storage systems 210. It also provides additional "federated" capabilities where the individual data storage system 210 coordinate operations to achieve a goal across datacenters, such as consolidated reporting, failover of management operations by a remote data storage system 210, and storage management operations that span datacenters, such as a long distance replication. It further provides disaster restart capability of any individual data storage system 210 for any other individual data storage system 210 to facilitate business continuance of storage management in the event of a partial or full datacenter failure.

Up until now, a single storage data storage system 210 cannot coordinate with other data storage systems 210 to achieve the goals stated above. This imposes unreasonable expectations on a cloud storage infrastructure that requires storage management in multiple datacenters by requiring the user to log into several different platforms and manually consolidate reports, or externally orchestrate storage management operations that span multiple datacenters outside of the data storage system 210. Prior approaches required manual procedures to copy and store recoverable clones of the storage data storage systems 210 offsite to facilitate disaster restart capability.

Figure 5:
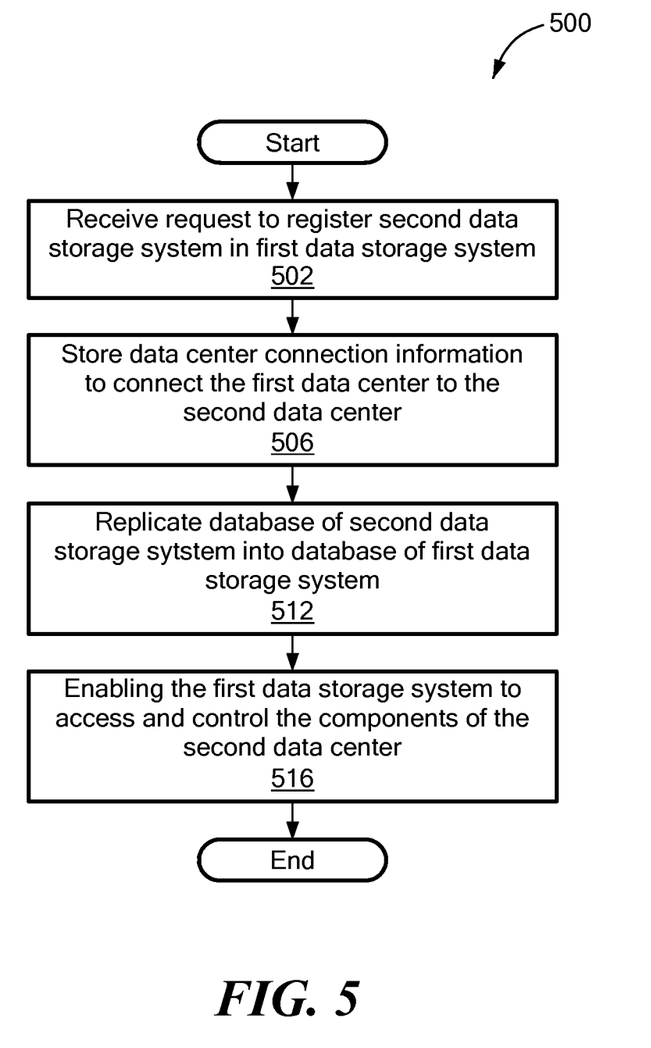
FIG. 5 is a simplified flowchart of an example of a process to manage a remote data center from another data center.

Referring to FIG. 5, an example of a process to manage a remote data center from another data center is a process 500. Process 500 results in component connection information and component management information that is stored in the database 250b of the data storage system 210b in the data center 300b to be stored in the database 250a of the data storage system 210a in the data center 300a so that the data storage system 210a is enabled to perform management and monitoring operations on the components of the data center 300b, not previously possible due to long latencies between data storage system in one data center to individual components to a remote data storage system (e.g., data center 300b).

The reverse may also be true. That is, when data center 300b is discovered from data storage system 210a, the data center 210b may also discover data center 300a automatically given shared security.

Process 500 receives a request to register a second data storage system into a first data storage system (502). For example, a user indicates that the data storage system 210b be registered with the first data storage system 210a.

Process 500 stores data center connection information to connect the first data center to the second data center (506). For example, the data center connection information to connect the first data center to the second data center is stored in the database 250a of the data storage system 210a. For example, processing block 506 stores data center connection information required to establish a connection with the second data center 300b using the second data storage system 210b. In one example, data center 300a receives a command line interface request or an application program interface request to register data center 300b. The request contains a connection address, such as an IP address, port number, and credentials to access data center 300b. In one example, information regarding security policy and expected scope of management may be specified.

Process 500 replicates second data storage system database into the first data storage system (512). For example, the database 250b from the second data storage system 210b is replicated to the database 250a of first data storage system 210a. The database 250b, and now database 250a, includes the connections from the data storage system 210b to the components (e.g., servers 320b, replicator 330b, virtual storage 340b, storage devices 350b and networks 360b) as well as the component management information. Thus, the data storage system 210a is aware of and is able to access and control servers 320b, replicator 330b, virtual storage 340b, storage devices 350b and networks 360b.

In one particular example, the replication of connection information and the component information from the second database 250b to the first database 250a results in database 250a containing connection and operational information required to monitor and manage the components (e.g., servers 320b, replicator 330b, virtual storage 340b, storage devices 350b and networks 360b). In one example, the information replicated for each component includes a connection address, such as an IP address, port number, and credentials to access the component. In other examples, information regarding security policy and expected scope of management may be specified.

The replication of information of the second data storage system 210b in the first data storage system 210a results in database 250a containing the managed resources of each component.

Process 500 enables the first data storage system to access and control the components of the second data center (516). For example, the data storage system 210a is enabled to perform management and monitoring operations on the components 320b, 330b, 340b, 350b, 360b.

Figure 6:
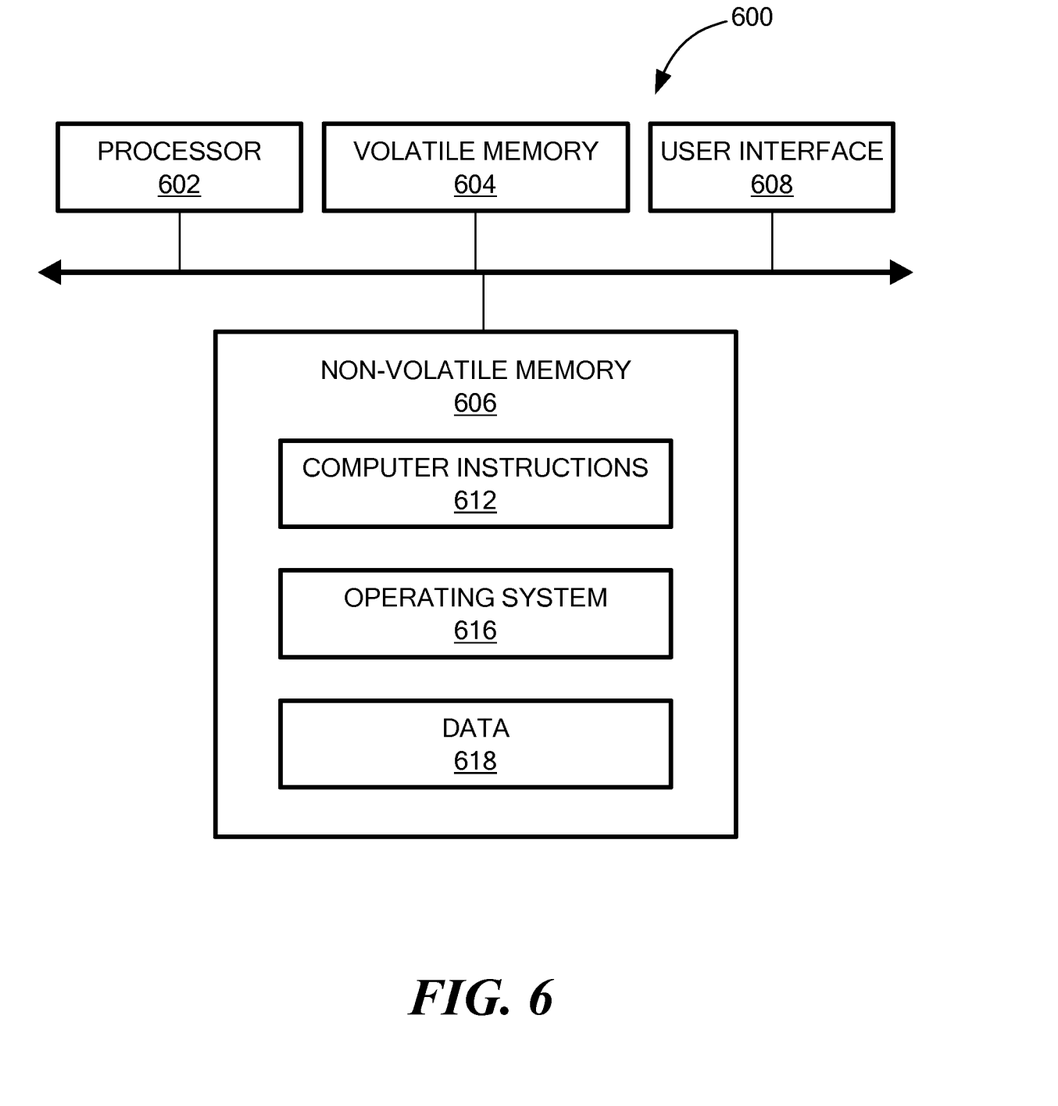
FIG. 6 is a simplified block diagram of an example of a computer on which any of the process of FIG. 5 may be implemented.

Referring to FIG. 6, a computer includes a processor 602, a volatile memory 604, a non-volatile memory 606 (e.g., hard disk) and the user interface (UI) 608 (e.g., a graphical user interface, a mouse, a keyboard, a display, touch screen and so forth). The non-volatile memory 606 stores computer instructions 612, an operating system 616 and data 618. In one example, the computer instructions 612 are executed by the processor 602 out of volatile memory 604 to perform all or part of the processes described herein (e.g., process 500).

The processes described herein (e.g., process 500) are not limited to use with the hardware and software of FIG. 6; they may find applicability in any computing or processing environment and with any type of machine or set of machines that is capable of running a computer program. The processes described herein may be implemented in hardware, software, or a combination of the two. The processes described herein may be implemented in computer programs executed on programmable computers/machines that each includes a processor, a non-transitory machine-readable medium or other article of manufacture that is readable by the processor (including volatile and non-volatile memory and/or storage elements), at least one input device, and one or more output devices. Program code may be applied to data entered using an input device to perform any of the processes described herein and to generate output information.

The system may be implemented, at least in part, via a computer program product, (e.g., in a non-transitory machine-readable storage medium such as, for example, a non-transitory computer-readable medium), for execution by, or to control the operation of, data processing apparatus (e.g., a programmable processor, a computer, or multiple computers)). Each such program may be implemented in a high level procedural or object-oriented programming language to communicate with a computer system. However, the programs may be implemented in assembly or machine language. The language may be a compiled or an interpreted language and it may be deployed in any form, including as a stand-alone program or as a module, component, subroutine, or other unit suitable for use in a computing environment. A computer program may be deployed to be executed on one computer or on multiple computers at one site or distributed across multiple sites and interconnected by a communication network. A computer program may be stored on a non-transitory machine-readable medium that is readable by a general or special purpose programmable computer for configuring and operating the computer when the non-transitory machine-readable medium is read by the computer to perform the processes described herein. For example, the processes described herein may also be implemented as a non-transitory machine-readable storage medium, configured with a computer program, where upon execution, instructions in the computer program cause the computer to operate in accordance with the processes. A non-transitory machine-readable medium may include but is not limited to a hard drive, compact disc, flash memory, non-volatile memory, volatile memory, magnetic diskette and so forth but does not include a transitory signal per se.

The processes described herein are not limited to the specific examples described. For example, the process 500 is not limited to the specific processing order of FIG. 5. Rather, any of the processing blocks of FIG. 5 may be re-ordered, combined or removed, performed in parallel or in serial, as necessary, to achieve the results set forth above.

The processing blocks (for example, in the process 500) associated with implementing the system may be performed by one or more programmable processors executing one or more computer programs to perform the functions of the system. All or part of the system may be implemented as, special purpose logic circuitry (e.g., an FPGA (field-programmable gate array) and/or an ASIC (application-specific integrated circuit)). All or part of the system may be implemented using electronic hardware circuitry that include electronic devices such as, for example, at least one of a processor, a memory, a programmable logic device or a logic gate.

Elements of different embodiments described herein may be combined to form other embodiments not specifically set forth above. Other embodiments not specifically described herein are also within the scope of the following claims.

What is claimed is:

1. A method comprising:
    receiving a request to register a second data storage system of a second data center in a first data storage system of a first data center;
    storing data center connection information to connect the second data center to the first data center;
    replicating a database to the first data storage system, the database comprising component connection information to connect the second storage system to components of the second data center and component management information configured to monitor and manage the components; and
    in response to detecting a failure affecting an ability to communicate with a data storage system component within the second data storage system, performing, from the first data storage system, management operations on the components of the second data center by accessing and controlling the components of the second data center from the first data storage system using the component connection information and the component management information, wherein performing management operations on the components of the second data center include allocating data storage ports and using the allocated data storage ports to export volumes from storage arrays in the second data storage system;
    wherein components of the first data center include one or more storage devices and one or more networks, and the component connection information includes information to connect the one or more storage devices and the one or more networks of the first data center to the second data storage system;
    wherein the method further comprises:
    collecting the component connection information and the component management information, comprising:
    collecting, for each of the storage devices, information about the physical storage arrays, storage pools, and available capacities required to coordinate storage operations across geographies; and
    collecting, for each of the networks, information about storage fabrics, fabric and IP switches, connected storage addresses, and configuration information about the storage fabrics and networks;
    wherein the performing management operations further comprises automatically zoning from the collected information, the storage fabrics, including network connectivity of selected components, when storage volumes are exported within a neighborhood of a corresponding data center, the neighborhood indicating a fault domain within a network, the fault domain comprising a segmented portion of the corresponding data center that is isolated from other fault domains in the corresponding data center such that a failure at one fault domain has no impact on other fault domains.

2. The method of claim 1, wherein storing data center connection information comprises storing at least one of an IP address and a port number to access the second data center.

3. The method of claim 1, wherein the database is a second database, and further comprising:
    storing data center connection information to the first data center at the second data center;
    replicating a first database to the second data storage system, the first database comprising component connection information to connect the first storage system to components of the first data center and component management information required to monitor and manage the components of the first data center; and
    accessing and controlling the components of the first data center from the second data storage system;
    wherein the components of the first data center further include one or more servers, one or more replicators, and one or more virtual storage devices, and the component connection information includes information to connect the one or more servers, the one or more replicators, and the one or more virtual storage devices of the first data center to the second data storage system.

4. The method of claim 1, wherein receiving a request to register a second data storage system of a second data center in a first data storage system of a first data center comprises receiving one of a command line interface request or an application program interface request to register the second data center.

5. The method of claim 1 wherein the components of the second data center include one or more servers, one or more replicators, one or more storage devices, and one or more networks.

6. The method of claim 5 wherein the component connection information includes information to connect the one or more servers, the one or more replicators, the one or more storage devices, and the one or more networks of the second data center to the first data storage system.

7. The method of claim 1, wherein storing data center connection information comprises storing information regarding a scope of management;
wherein the scope of management includes centrally managing multiple data centers including the first data center and the second data center, the scope of management including:
consolidated reporting;
failover of management operations by a remote data storage system;
storage management operations that span the multiple data centers, the operations including long distance replication; and
disaster restart capability of any individual data storage system for any other individual data storage system, the disaster restart capability configured to provide business continuance of storage management in the event of a partial or full datacenter failure.

8. The method of claim 1,
wherein the management operations performed from the first data storage system include:
dedicating one or more data storage ports on the second data storage system to a specified export group; and
wherein the first storage system, via the component connection information, automatically generates connectivity between the first storage system and select components of the second storage system when storage volumes of the second storage system are exported or exposed for consumption.

9. An apparatus, comprising:
electronic hardware circuitry configured to:
receive a request to register a second data storage system of a second data center in a first data storage system of a first data center;
store data center connection information to connect the second data center to the first data center;
replicate a database to the first data storage system, the database comprising component connection information to connect the second storage system to components of the second data center and component management information configured to monitor and manage the components; and
in response to detecting a failure affecting an ability to communicate with a data storage system component within the second data storage system, perform, from the first data storage system, management operations on the components of the second data center by accessing and controlling components of the second data center from the first data storage system using the component connection information and the component management information, wherein performing management operations on the components of the second data center include allocating data storage ports and using the allocated data storage ports to export volumes from storage arrays in the second data storage system,
wherein components of the first data center include one or more storage devices and one or more networks, and the component connection information includes information to connect the one or more storage devices and the one or more networks of the first data center to the second data storage system;
Wherein the electronic hardware circuitry is further configured to:
collect the component connection information and the component management information, comprising:
collect, for each of the storage devices, information about the physical storage arrays, storage pools, and available capacities required to coordinate storage operations across geographies; and
collect, for each of the networks, information about storage fabrics, fabric and IP switches, connected storage addresses, and configuration information about the storage fabrics and networks;
wherein the performing management operations further comprises automatically zoning from the collected information, the storage fabrics, including network connectivity of selected components, when storage volumes are exported within a neighborhood of a corresponding data center, the neighborhood indicating a fault domain within a network, the fault domain comprising a segmented portion of the corresponding data center that is isolated from other fault domains in the corresponding data center such that a failure at one fault domain has no impact on other fault domains.

10. The apparatus of claim 9, wherein the circuitry configured to store data center connection information comprises circuitry configured to store at least one of an IP address and a port number to access the second data center.

11. The apparatus of claim 9, wherein the circuitry configured to store data center connection information to the second data center at the first data center comprises circuitry configured to store data center connection information to the second data center at the first data storage system.

12. The apparatus of claim 9, wherein the database is the second database, and further comprising circuitry configured to:
store data center connection information to the first data center at the second data center;
replicate a first database to the second data storage system, the first database comprising component connection information to connect the first storage system to components of the first data center and component management information required to monitor and manage the components of the first data center; and
access and control the components of the first data center from the second data storage system;
wherein the components of the first data center further one or more servers, one or more replicators, and one or more virtual storage devices, and the component connection information includes information to connect the one or more servers, the one or more replicators, and the one or more virtual storage devices of the first data center to the second data storage system.

13. The apparatus of claim 9, wherein the circuitry configured to receive a request to register a second data storage system of a second data center in a first data storage system of a first data center comprises circuitry configured to receive one of a command line interface request or an application program interface request to register the second data center.

14. An article comprising:
   a non-transitory computer-readable medium that stores computer-executable instructions, the instructions causing a machine to:
   receive a request to register a second data storage system of a second data center in a first data storage system of a first data center;
   store data center connection information to connect the second data center to the first data center;
   replicate a database to the first data storage system, the database comprising component connection information to connect the second storage system to components of the second data center and component management information configured to monitor and manage the components; and
   in response to detecting a failure affecting an ability to communicate with a data storage system component within the second data storage system, perform, from the first data storage system, management operations on the components of the second data center by accessing and controlling components of the second data center from the first data storage system using the component connection information and the component management information, wherein performing management operations on the components of the second data center include allocating data storage ports and using the allocated data storage ports to export volumes from storage arrays in the second data storage system;
   wherein components of the first data center include one or more storage devices and one or more networks, and the component connection information includes information to connect the one or more storage devices and the one or more networks of the first data center to the second data storage system;
   Wherein the instructions further cause the machine to:
   Collect the component connection information and the component management information, comprising:
   collect, for each of the storage devices, information about the physical storage arrays, storage pools, and available capacities required to coordinate storage operations across geographies; and
   collect, for each of the networks, information about storage fabrics, fabric and IP switches, connected storage addresses, and configuration information about the storage fabrics and networks;
   wherein the performing management operations further comprises automatically zoning from the collected information, the storage fabrics, including network connectivity of selected components, when storage volumes are exported within a neighborhood of a corresponding data center, the neighborhood indicating a fault domain within a network, the fault domain comprising a segmented portion of the corresponding data center that is isolated from other fault domains in the corresponding data center such that a failure at one fault domain has no impact on other fault domains.

15. The article of claim 14, wherein the instructions causing the machine to store data center connection information comprises instructions causing the machine to store at least one of an IP address and a port number to access the second data center.

16. The article of claim 14, wherein the database is a second database, and further comprising instructions causing the machine to:
   store data center connection information to the first data center at the second data center;
   replicate a first database to the second data storage system, the first database comprising component connection information to connect the first storage system to components of the first data center and component management information required to monitor and manage the components of the first data center; and
   access and control the components of the first data center from the second data storage system;
   wherein the components of the first data center include one or more servers, one or more replicators, and one or more virtual storage devices, and the component connection information includes information to connect the one or more servers, the one or more replicators, and the one or more virtual storage devices of the first data center to the second data storage system.

17. The article of claim 14, wherein the instructions causing the machine to receive a request to register a second data storage system of a second data center in a first data storage system of a first data center comprises instructions causing the machine to receive one of a command line interface request or an application program interface request to register the second data center.

* * * * *